Aug. 24, 1954
J. E. STOUT
2,687,237
DISPENSING AND METERING DEVICE FOR CONCENTRATES AND THE LIKE
Filed Feb. 27, 1953
2 Sheets-Sheet 1
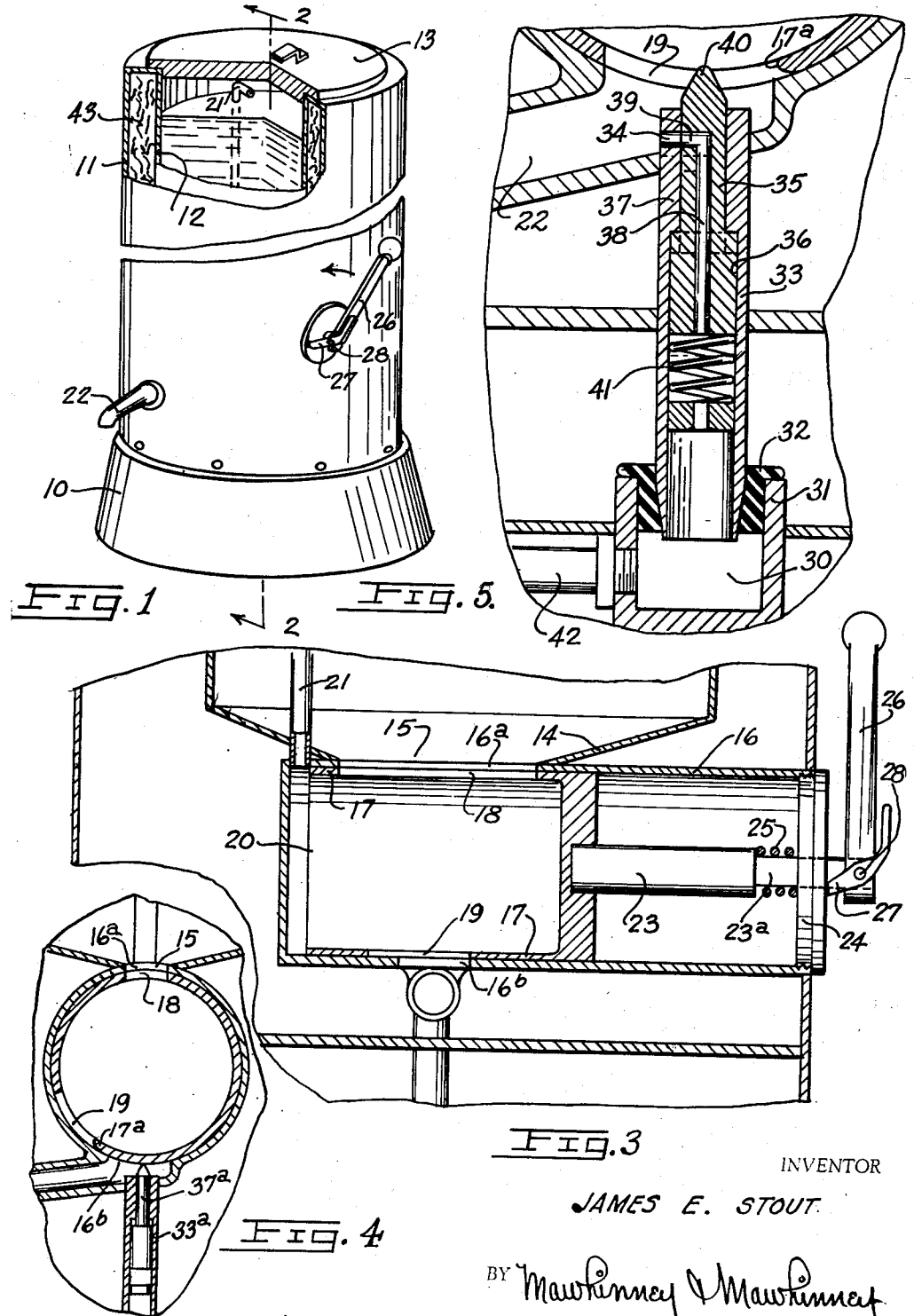
INVENTOR
JAMES E. STOUT
BY Mawhinney & Mawhinney
ATTORNEYS Aug. 24, 1954
J. E. STOUT
2,687,237
DISPENSING AND METERING DEVICE
FOR CONCENTRATES AND THE LIKE
Filed Feb. 27, 1953
2 Sheets-Sheet 2
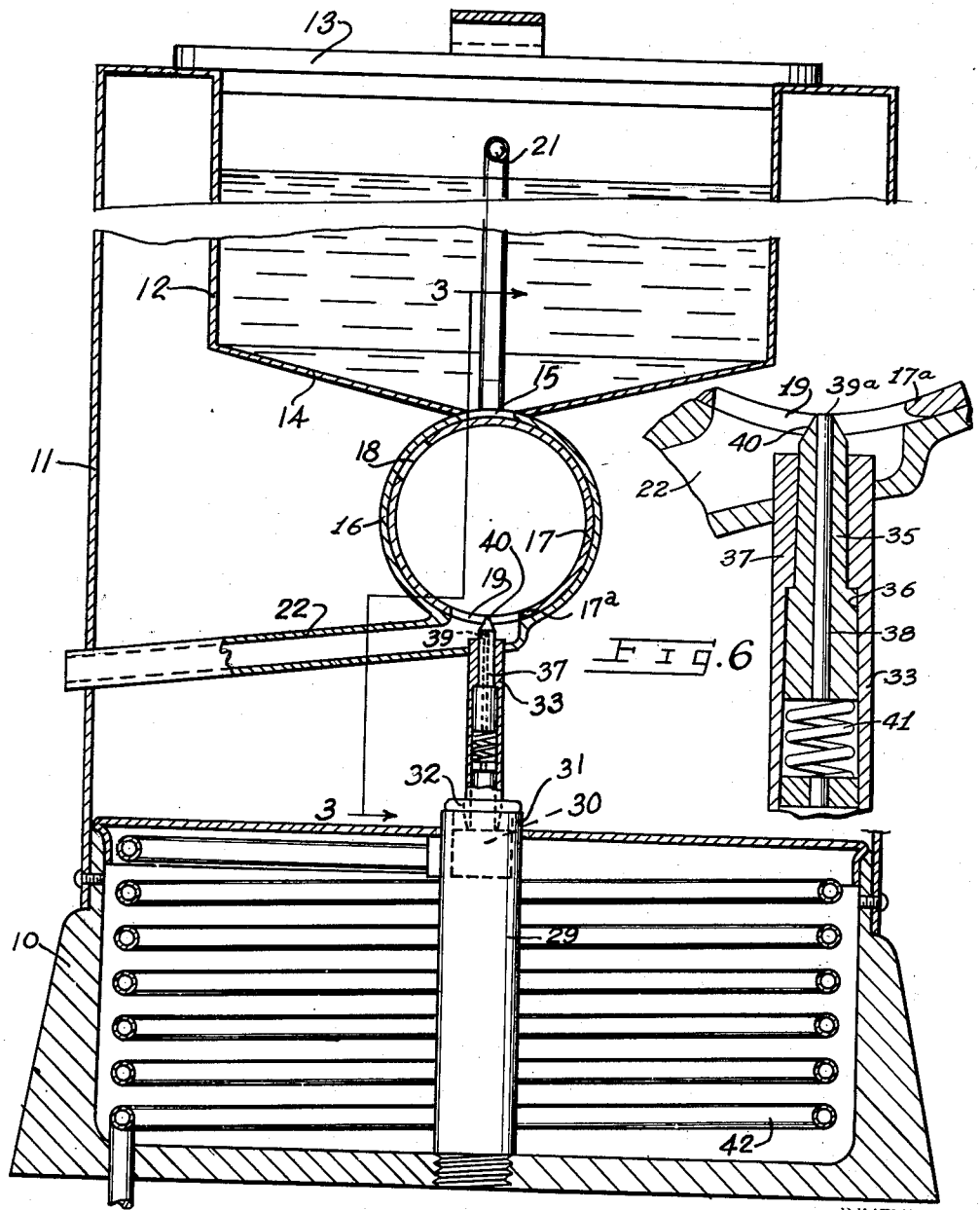
INVENTOR
JAMES E. STOUT
BY Mawhinney & Mawhinney
ATTORNEYS Patented Aug. 24, 1954

2,687,237

UNITED STATES PATENT OFFICE 2,687,237

DISPENSING AND METERING DEVICE FOR CONCENTRATES AND THE LIKE

James E. Stout, Mount Dora, Fla., assignor to Mix-A-Trate, Inc., Mount Dora, Fla., a corporation of Florida Application February 27, 1953, Serial No. 339,204

6 Claims. (Cl. 222—129.3)

An object of the present invention is to provide a device of the character described which permits mixing of the concentrate with either plain or carbonated water and which is of simple construction permitting sanitary maintenance in compliance with health regulations of the various States and which also permits varying the size of the drink to be dispensed.

A further object of the present invention is to provide a device of the character described in which the water supply is rendered inoperative when the metering device is being filled with concentrate and which will, upon rotation of the metering device and closing of the concentrate filling connection, permit the water dispensing device to be actuated upon attaining registry with the discharge port of the metering device whereby both the concentrate and the water are mixed.

With the foregoing and other objects in view, the invention will be more fully described hereinafter, and will be more particularly pointed out in the claims appended hereto.

In the drawings, wherein like symbols refer to like or corresponding parts throughout the several views;

Figure 1 is a perspective view of a device constructed in accordance with the present invention with parts broken away and parts shown in section;

Figure 2 is a vertical section taken on an enlarged scale with parts broken away and parts shown in section taken on the line 2—2 in Figure 1;

Figure 3 is a fragmentary vertical section taken on the line 3—3 in Figure 2;

Figure 4 is a fragmentary transverse section showing a modified form of water control device to be employed with the present invention; and Figure 5 is a fragmentary vertical section with parts broken away and parts shown in section of the preferred form of water control device employed in connection with the present invention.

Figure 6 is a fragmentary vertical section with parts broken away and parts shown in section of a modified form of water control device employed in connection with the present invention.

In the following description, the term "concentrate" is defined to mean any liquid which is to be mixed with water to form a beverage. The term "water" as employed herein is defined to mean carbonated water, plain water or any basic liquid such as milk, coffee, tea.

Referring more particularly to the drawings, 10 designates a base upon which is carried a casing 11 having a concentrate container 12 therein. A lid 13 is provided for protecting the contents of the container 12 from the introduction of foreign matter thereinto. The bottom of the container 14 may be of truncated conical form having the apex removed therefrom defining a discharge opening 15. This discharge opening 15 communicates with a dispensing cylinder 16 through an opening 16a. The bottom of this cylinder 16 is provided with a lower or discharge opening 16b.

Situated within the dispensing cylinder 16 is a metering piston 17 having a filling port 18, a discharge port 19 and an open or free end 20. This piston is snugly received within the cylinder with such clearance therebetween as to permit of a fluid-tight construction such that liquid under a head in the container 12 will not seep around the piston 17 and be discharged in effect as by-passing the piston 17. There is a space provided between the free or open end 20 of the piston 17 and the closed end of the cylinder. This space is in communication with a vent tube 21. This vent tube, as shown in Figure 1, must rise above the height of concentrate in the container 12 in order that the liquid in the container 12 not be bled into the metering piston fortuitously.

The lower opening 16b of the dispensing cylinder is in communication with the discharge spout 22.

The piston 17 has connected thereto at its closed end an operating shaft 23. This operating shaft 23 has a reduced diameter portion 23a which is received through a bearing cap 24. A helical spring 25 is provided between the reduced diameter portion of said operating shaft and the end bearing cap 24. Secured externally of the casing 11 to the operating shaft 23 is a lever or operating handle 26. This handle 26 carries thereon a cam 27 pivoted thereto as at 28. This piston 17 is positioned within the cylinder 16 for both rotational movement and displacement along the longitudinal axis of the cylinder 16.

The water supply to this device is attained by connecting the base 10 to a suitable water supply 30, the base being permanent and the top portion of necessity being removable.

A fitting 31, which is supported on post 29, is provided with a rubber gasket 32 into which is inserted a stem 33. This stem 33 is provided with a discharge port 34 and a bore 35 and a bore 36 of greater diameter than the bore 35. Carried within the stem for vertical reciprocating movement is a plunger 37 having a bore 38 partially axially therethrough which bore has a discharge port 39. The upper portion of this plunger is provided with a rounded nose 40 positioned to be engaged by the curved nosed portion 17a upon rotation of the piston 17 within the cylinder 16. The plunger 37 is urged to the position shown in Figure 5 by a spring 41. In the position shown in Figure 5, the bore 38 is in communication with the opening 34 thereby permitting water to be discharged into the spout 22 to mix with the concentrate being discharged from the port 19 of the piston 17. When the amount of water desired has been mixed with the concentrate the piston is then rotated back to its filling position whereby the nose 17a of the piston will contact the rounded nose 40 of the plunger thereby forcing the plunger downwardly compressing spring 41 and removing the opening 39 from registry with the opening 34 thereby cutting off the water supply to the discharge spout 22.

When it is desired to increase the amount of concentrate for a particular drink, for example when a double or king size drink is desired, the piston 17 is shifted axially within the cylinder 16, for example to the right in Figure 3. This is done by rotating the cam 27 which is pivoted to the operating lever 26 at 28 in such a way that the cam surface abuts the end bearing cap 24 which acts to compress the spring 25 and shift the piston 17. After this particular drink has been mixed the cam is returned to an inoperative position whereby the handle 26 will return to the end cap 24 thereby permitting an axial shift of the piston 17 within the cylinder 16 to the left due to urging or expansion of the spring 25. The amount of axial shift of the piston will be dependent upon the length of the cam surface 27 from the pivot 28 and also the length of the spring 25.

The water coming into the base 10 may be passed through coils 42 which may be surrounded by ice or subjected to other suitable cooling devices.

The water supply device may be constructed, for instance as shown in Figure 2, in which water emitted from the port 39 of the plunger 37 is discharged above the stem 33.

If desired, as best seen in Figure 6, the axial bore 38 within the plunger 37 may be extended upwardly so that the water is discharged vertically, rather than horizontally, such discharge being from a point on the upper conical surface of the nose 40. Such arrangement will create a spray or swirl of water within the metering piston which will not only mix with the concentrates of the metering piston but which will also perform a cleansing function within the metering piston.

In operation, the device functions as follows. The upper casing 11 is seated upon the base 10 whereby the stem 33 is inserted through the grommet 32, as best seen in Figure 5. This renders the water supply control subject to the action of the metering piston 17, the water control then being shut off as shown in Figure 4 with the filling port 18 of the metering piston being in registry with the discharge port 15 of the concentrate container 12. The concentrate within the container 12 then fills the metering piston 17, air being expelled therefrom as liquid enters through the vent line 21. When the metering piston is full, the operator rotates the handle 26 toward the front of the device as shown by the arrow in Figure 1. This rotation of the handle 26 causes the piston 17 to be rotated within the cylinder 16 in such a manner that the port 18 is taken out of registry with the filling port 15 and the metering piston thereby seals off the concentrate container 12. When the handle 26 has been moved through a predetermined arc, the port 19 comes into registry with the discharge spout opening 22 whereby, as shown in Figure 5, the plunger enters a portion of the opening 19 in the metering piston 17 which permits the opening 39 of the plunger 37 to come into registry with the opening 34 of the stem 33 whereby water is ejected or emitted into the discharge spout 22 to permit mixing of the concentrate being discharged by gravity through the opening 19 into the discharge spout 22. When sufficient water has been mixed with the metered concentrate, the lever 26 is then rotated back to its initial position wherein the metering piston shuts off the water supply and permits the opening 18 to once again come into registry with the opening 15 in the concentrate container, as shown in Figure 4.

When larger amounts of concentrates are desired, as described above, the cam 27 is rotated so that its lobe working surface rises between the handle 26 and the bearing cap 24. This will cause the axial shift of the piston 17 above described thereby increasing the volumetric capacity of the metering device.

In order to assure proper rotational movement of the handle 26 to the filling and discharge positions, suitable stops may be provided on the bearing caps 24 to limit rotational movement on the handle 26.

Referring more particularly to Figure 1, the area lying between the casing 11 and the concentrate container 12 may be provided with suitable insulating material 43. It will be appreciated that the dispensing device consisting of the metering piston and cylinder together with the water control device may be adapted to existing forms of dispensers.

While I have shown here and described but one form of the invention, I do not restrict the invention to the specific embodiment illustrated but reserve all modifications of this invention which fall within the scope of the appended claims.

What I claim is:

1. In a dispensing device for concentrates and the like a concentrate container having a discharge port, a metering cylinder having a filling port in registry with the discharge port of said concentrate container and a discharge port, a metering piston within said cylinder, filling and discharge ports through portions of the wall thereof, said filling port of said piston being positioned to be out of registry with the discharge port of said concentrate container when the discharge port of said piston is in registry with the discharge port of said cylinder, pressure actuated water control means having a discharge port positioned to mix water emitted therefrom with concentrate discharged from said cylinder when an element of said pressure actuated water control means enters a portion of the discharge port of said piston, and control means for said metering piston connected to rotate said piston within said cylinder whereby when the filling port of said piston is in registry with the discharge port of said concentrate container a portion of the wall of said piston renders said pressure actuated water control means inoperative and when said discharge port of said piston comes into alignment with said pressure actuated water control means said means is rendered operative causing water to be emitted therefrom in mixture with concentrate being discharged from said metering piston, said discharge port of said concentrate container being closed off by the wall of said piston.

2. A dispensing device as claimed in claim 1 further comprising displacement means operatively connected with said control means being positioned between an element of said control means and a fixed portion of said dispensing device whereby said displacement means will cause said metering piston to be axially shifted in said metering cylinder increasing the volumetric capacity between the closed end of said piston and an end of said metering cylinder.

3. A dispensing device as claimed in claim 2 wherein said displacement means comprises a cam member pivotally carried by an element of said control means positioned to upon rotation of said cam place the cam between a fixed portion of said device and said carrying element whereby said metering piston is axially shifted in said metering cylinder.

4. A dispensing device for concentrates and the like comprising a frame, a container for concentrates having a discharge port in the bottom thereof carried in an upper portion of said frame, a metering cylinder having filling and discharge ports positioned beneath said concentrate container with its filling port in registry with the discharge port of said concentrate container, spring actuated water control valve means positioned beneath said metering cylinder and having an element thereof with an axial discharge orifice therethrough and being adapted to enter a portion of the discharge port of said metering cylinder in its normally biased position whereby water is emitted vertically therefrom into said metering cylinder, a beverage discharge spout one end of which is in communication with the discharge port of said metering cylinder and the output of said water control valve for mixing concentrate discharged from said metering cylinder with water emitted from said water control valve, a metering piston, filling and discharge ports in the wall thereof rotatably carried within said cylinder, the filling and discharge ports of said piston being so relatively angularly positioned in the piston wall that the filling and discharge ports of the piston never attain alignment simultaneously with the filling and discharge ports of the cylinder, a wall of the discharge port of said piston being adapted to contact the element of said water control valve which passes through the discharge port of said cylinder to cause said water control valve to be inoperative when the filling port of said metering piston is in registry with the filling port of said cylinder, and control means carried by said piston for causing rotation of said piston within said cylinder for filling the piston with concentrate and upon rotation of the piston placing the discharge port of said piston in alignment with the discharge port of said cylinder and unseating said water control valve whereby the concentrate being discharged from said metering piston will mix with water being emitted into said cylinder in a swirl and being discharged through the discharge spout to form the beverage.

5. A dispensing device for concentrates and the like comprising a frame, a container for concentrates having a discharge port in the bottom thereof carried in an upper portion of said frame, a metering cylinder having filling and discharge ports positioned beneath said concentrate container with its filling port in registry with the discharge port of said concentrate container, a beverage discharge spout one end of which is in communication with the discharge port of said metering cylinder, a metering piston, filling and discharge ports in the wall thereof rotatably carried within said cylinder, said filling and discharge ports of said piston being so relatively positioned through the wall of said piston that said filling and discharge ports of said piston never attain alignment simultaneously with the filling and discharge ports of the cylinder, a water control valve comprising a hollow stem, an operating plunger having an axial bore at least partially therethrough, said bore communicating with the external surface of said plunger proximate the upper portion thereof, spring means beneath said plunger for urging said plunger upwardly through said stem permitting the upper end of said bore to rise above the stem whereby water may be emitted therefrom, said plunger having a rounded conical nose portion at its upper end adapted to be cammed downwardly by said metering piston to shut off the water supply when the filling port of said metering piston is in registry with the discharge port of said concentrate container, and control means carried by said piston for causing rotation of said piston within said cylinder for filling said piston with concentrate and upon rotation of said piston displacing the discharge port thereof in alignment with the discharge port of said cylinder and unseating said water control valve whereby the concentrate being discharged from said metering piston will flow in mix with the water through said discharge spout to form the beverage.

6. A dispensing device as claimed in claim 5 further comprising means for shifting the metering piston within said cylinder axially thereof whereby the volumetric capacity of the metering piston is increased.

References Cited in the file of this patent

UNITED STATES PATENTS

| Number | Name | Date |
|---|---|---|
| 1,438,595 | Hale | Dec. 12, 1922 |
| 1,536,854 | Holderle et al. | May 5, 1925 |
| 2,453,553 | Tanoley | Nov. 9, 1948 |